(12) United States Patent
Colombo

(10) Patent No.: US 7,011,232 B2
(45) Date of Patent: Mar. 14, 2006

(54) INFLATOR FOR INFLATING PNEUMATIC PROTECTIVE ARTICLES OR GEAR

(75) Inventor: Fabio Giovanni Colombo, Milan (IT)

(73) Assignees: Fabio Giovanni Fedele Columbo, Milan (IT); Antonio Primo Columbo, Milan (IT)

( * ) Notice: Subject to any disclaimer, the term of this patent is extended or adjusted under 35 U.S.C. 154(b) by 59 days.

(21) Appl. No.: 10/471,013

(22) PCT Filed: May 15, 2002

(86) PCT No.: PCT/IT02/00317

§ 371 (c)(1),
(2), (4) Date: Sep. 8, 2003

(87) PCT Pub. No.: WO02/094617

PCT Pub. Date: Nov. 28, 2002

(65) Prior Publication Data

US 2004/0094569 A1 May 20, 2004

(30) Foreign Application Priority Data

May 18, 2001 (IT) .................................... MI20010281 U

(51) Int. Cl.
*F17C 7/00* (2006.01)

(52) U.S. Cl. ........................................................ 222/5
(58) Field of Classification Search .................. 411/41, 411/92, 93, 94; 137/68.3; 222/5
See application file for complete search history.

(56) References Cited

U.S. PATENT DOCUMENTS 1,704,944 A * 3/1929 Johann .......................... 222/5

(Continued)

FOREIGN PATENT DOCUMENTS

DE    29905908    7/1999

(Continued)

OTHER PUBLICATIONS

Patent Abstracts of Japan, vol. 007, No. 211 (M–243), Sep. 17, 1983 & JP 58 106299 A (NIHON TANSAN GAS KK), Jun. 24, 1983, abstract.

*Primary Examiner*—Kenneth Bomberg
(74) *Attorney, Agent, or Firm*—Wenderoth, Lind & Ponack, L.L.P.

(57) ABSTRACT

The inflator (10) for inflating a pneumatic protective article or gear comprises a gas-containing bottle (17) with a sealing cap (19) applied thereto, an inflator housing (12), a striking member (13) contained in the inflator housing (12) and capable of moving lengthwise therein and provided at a first end thereof with a protruding piercing pin (16) adapted to make a hole in the sealing cap (19), a coil compression spring (21) contained in the inflator housing (12) and adapted to urge the striking member (13) at a second end thereof, opposite to the first end carrying the piercing pin (16), and to drive the striking member (13) against the sealing cap (19) of the bottle (17), a gas outlet port (20) provided in a wall of the inflator housing (12) for permitting the gas contained in the bottle (17) to flow from the inflator (10) into the pneumatic protective article or gear, holding means (24, 25) associated with the inflator (10) and co-operating with the striking member (13) in order to releasably hold it in a cocked condition against the action of the coil compression spring (21), actuation means (26) associated with the inflator (10) and adapted to release the holding means (24, 25), control means (28) associated with the actuation means (21) and adapted to operate the inflator (10) by causing the actuation means to release the holding means. The shape of the piercing pin (16) prevents it from remaining stuck inside the hole made in the sealing cap (19) of the bottle (17). The backward travel of the piercing pin (16), once the sealing cap (19) is perforated, is not contrasted by the coil compression spring (21).

13 Claims, 3 Drawing Sheets

U.S. PATENT DOCUMENTS

| | | | | |
|---|---|---|---|---|
| 2,120,248 A | * | 6/1938 | Hinchman | 222/5 |
| 3,526,339 A | * | 9/1970 | Bernhardt et al. | 222/5 |
| 4,475,664 A | * | 10/1984 | Mackal | 222/5 |
| 4,498,604 A | * | 2/1985 | Mackal | 222/5 |
| 4,498,605 A | * | 2/1985 | Mackal et al. | 222/5 |
| 5,271,525 A | * | 12/1993 | Petrie | 222/5 |
| 5,615,743 A | * | 4/1997 | Matsumoto et al. | 222/5 |
| 6,123,227 A | * | 9/2000 | Umeda | 222/5 |
| 6,260,570 B1 | * | 7/2001 | Wass et al. | 222/5 |
| 2004/0094569 A1 | * | 5/2004 | Colombo | 222/5 |

FOREIGN PATENT DOCUMENTS

| | | |
|---|---|---|
| JP | 58-106299 | 6/1983 |
| WO | 00/73126 | 12/2000 |

\* cited by examiner

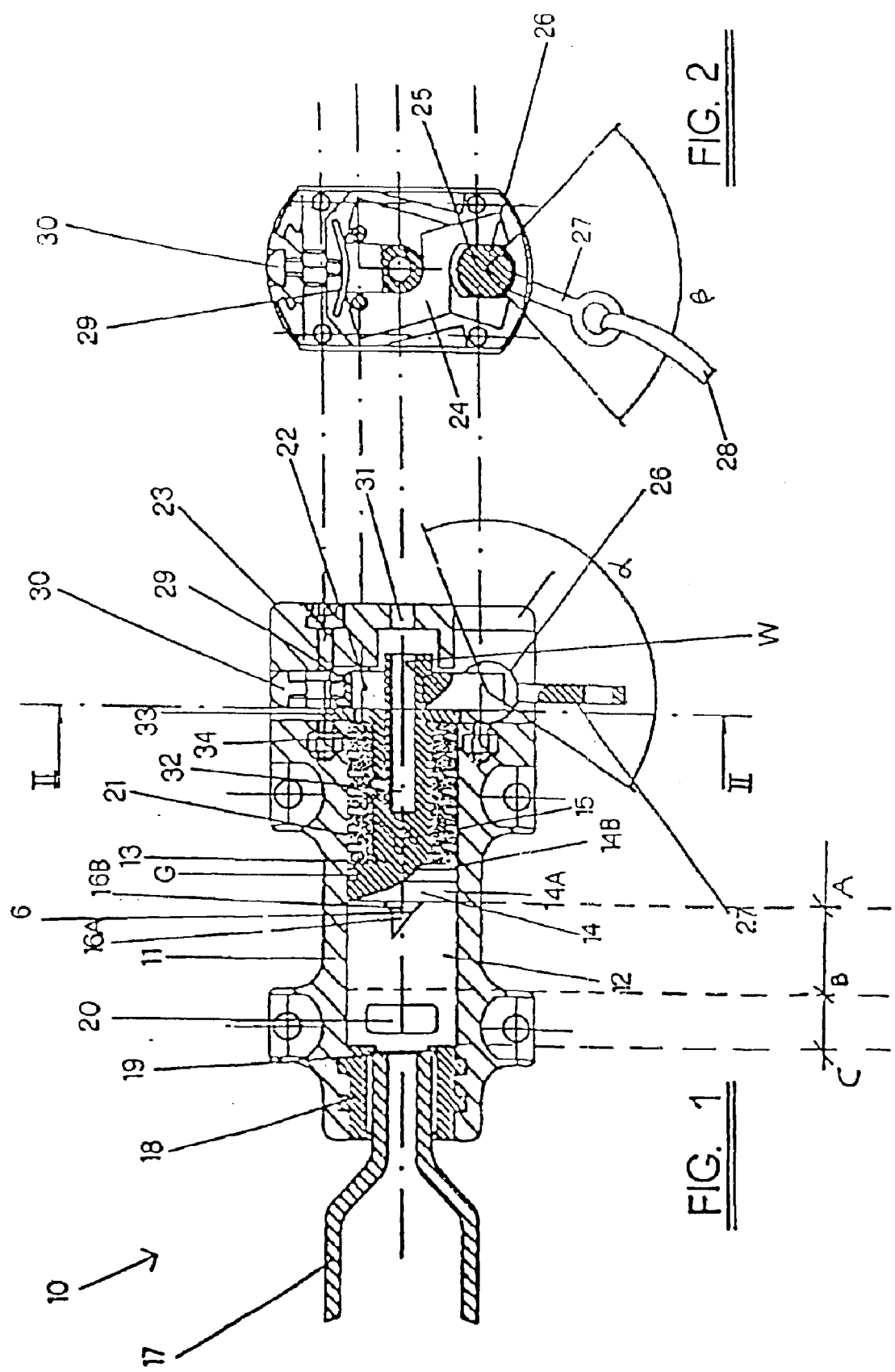

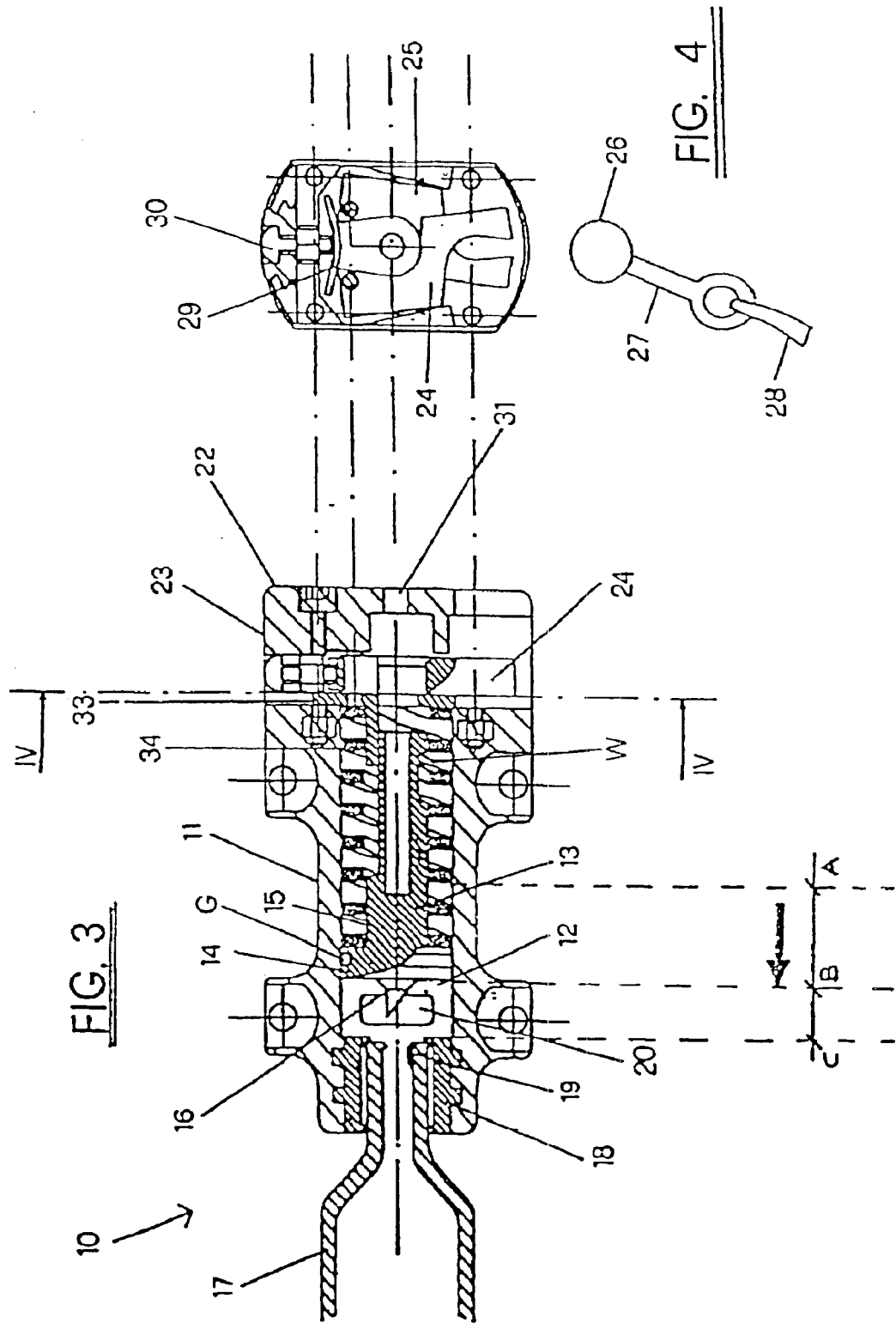

INFLATOR FOR INFLATING PNEUMATIC PROTECTIVE ARTICLES OR GEAR

TECHNICAL FIELD

The present invention generally relates to an inflator for inflating a pneumatic article or gear, such as an air bag for a motor vehicle rider, an inflatable jacket for a motor cycle rider or an inflatable sporting gear, of the kind used for assuring the safety of a person subject to the impact of a collision, in case a short time of inflation is required

BACKGROUND ART

Inflators of the above mentioned kind are known in the art and are disclosed, for instance in the German Utility Model No. 299 05 908 U and in the International Patent Application No. WO95/33389.

Document DE-299 05 908 U describes an inflatable protective jacket for a motorcycle rider provided with an inflator which is automatically operated for inflating the jacket when the motorcycle rider undergoes the impact of a collision. In an inflator of this kind, a blocking device is provided which holds a piercing pin in a cocked condition against the action of a coil compression spring. When the blocking device is released, the piercing pin is driven against and through a sealing plate forming the cap of a gas-containing bottle by action of the thrust exerted by the coil compression spring, thereby causing the gas contained in the bottle to escape therefrom and to flow into the inflatable jacket. The blocking device of the inflator can be automatically released by means of a short operating cord connected at one end to the inflator and at the other end to a motorcycle chassis. The piercing pin of the inflator can be reset in the cocked condition for permitting the inflator to be used again. A first drawback of an inflator of this kind resides in the fact that the piercing pin of the inflator may be retained inside the hole made in the cap of the gas-containing bottle, notwithstanding the thrust exerted by the pressurized gas contained in the bottle, and thereby it may obstruct the flow of the gas into the inflatable jacket. In fact, no measures have been taken until now in order to assure that really the piercing pin of the inflator is drawn out from the hole made in the cap of the bottle in the case the piercing pin is actuated by a coil compression spring. A second drawback of an inflator of this kind resides in the fact that, upon perforation of the sealing plate of the cap of the gas-containing bottle, the piercing pin is contrasted in its backward travel by the coil compression spring, and therefore it obstructs the flow of the gas by partially restricting the passage area through which the gas flows from the inflator into the inflatable jacket. A third drawback of an inflator of this kind resides in the fact that, once the sealing plate of the cap of the gas-containing bottle is perforated, the gas may escape from the inflator by passing through a hole in which the stem of the piercing pin is arranged when said piercing pin is held in the cocked condition against the action of the coil compression spring. Thus, the gas may not flow from the inflator into the inflatable jacket as intended, instead it may escape from the inflator into the surrounding environment without inflating the inflatable jacket. A fourth drawback of an inflator of this kind resides in the fact that it is not possible to adjust the force required for operating the inflator which shall be more or less responsive according to the intended use. Consequently, an inflator of the kind disclosed in the document DE-299 05 908 U exhibits a time of inflation of the inflatable jacket which is too long in duration for the intended application and does not assure a proper and certain inflation of the inflatable protective jacket. In the case of an inflator for inflating a pneumatic protective gear, the time of inflation is a critical parameter for evaluating the effectiveness of the inflator. The time of the inflation is defined herein as the sum of the time required to pierce the gas-containing bottle and the time required by the gas to escape from the bottle. The perforation time is defined as the interval between the instant the blocking device of the inflator is released and the instant the piercing pin of the inflator penetrates the cap of the gas-containing bottle. The escape time of the gas is defined as the interval between the instant the cap of the gas-containing bottle is perforated and the instant the gas-containing bottle is completely emptied. The escape time of the gas is much longer in duration than the perforation time, so that the time of inflation nearly corresponds to the escape time of the gas. In an inflator according to the document DE-299 05 908 U cited above the escape time of the gas is long in duration because: i) the hole made in the cap of gas-containing bottle is small in size, and thus the flow rate of the gas is limited; ii) the passage area for the gas around the piercing pin of the inflator, in the case it is retained in the cap of the gas-containing bottle, is narrow; and iii) the piercing pin of the inflator obstruct the flow of the gas escaping from the gas-containing bottle, even if it does not remain stuck in the sealing cap of the gas-containing bottle. Because of these drawbacks, the gas cannot flow freely and, moreover, a turbulence arises which greatly slows down the outflow speed of the gas. As a result, the escape time of the gas and the time of inflation are too long in duration for the intended use of the inflator. A means for obviating the drawbacks described above would be to make a hole in the cap of the gas-containing bottle having a size as large as possible, consistent with the structure of the cap of the gas-containing bottle, and to completely clear the passage for the gas escaping from the gas-containing bottle.

The International Patent Application No. WO95/33389 describes a safety apparel particularly, but not exclusively, for motorcyclists, equestrians and other unprotected persons comprising inflatable shock-absorbing pads. Inflation of the pads is effected with the aid of a gas-delivering arrangement which includes a gas-containing bottle which is sealed by means of a sealing plate, a small explosive charge, means for detonating the explosive charge in the event of an accident, and further a ball shaped device which is activated by the explosive charge so as to penetrate the sealing plate. The explosive charge is intended to be detonated by means of a striking pin operated by a spring. Means are arranged for storing the energy required therefore in the spring as a result of a relative motion between the wearer of the protective apparel and a motorcycle, a horse or the like caused by an accident. A drawback of the safety apparel described in this document resides in the fact that the apparel is potentially dangerous for the user since it is directly applied to an inflatable protective jacket. Furthermore, such a safety apparel has a rather complicated construction.

Therefore, there is the need to overcome the drawbacks of the known art by providing an inflator for inflating a pneumatic protective article or gear which does not rely on an explosive charge for its operation and is provided with means that permit the piercing pin of the inflator to generate a hole in the sealing cap of the gas-containing bottle having a size as large as possible and to withdraw after it has perforated the sealing cap of the gas-containing bottle, so as to completely clear the passage for the gas escaping from the gas-containing bottle and assure a very short time of inflation of the pneumatic protective article or gear.

DISCLOSURE OF INVENTION

According to the present, invention, this object is achieved by providing an inflator for inflating a pneumatic protective article or gear, comprising:

a gas-containing bottle with a sealing cap applied thereto, an inflator housing, a striking member contained in the inflator housing and capable of moving lengthwise therein and provided at a first end thereof with a protruding piercing pin adapted to make a hole in the sealing cap of the gas-containing bottle, a coil compression spring contained in the inflator housing and adapted to urge the striking member at a second end thereof, opposite to the first end carrying the piercing pin and to drive the striking member against the sealing cap of the gas-containing bottle, a gas outlet port provided in a wall of the inflator housing for permitting the gas contained in said gas-containing bottle to flow from the inflator into the pneumatic protective article or gear, holding means associated with the inflator and co-operating with the striking member in order to releasably hold it in a cocked condition against the action of the coil compression spring, actuation means associated with the inflator and adapted to release the holding means, and control means associated with the actuation means and adapted to operate the inflator by causing the actuation means to release the holding means.

The piercing pin comprises a point forming portion having the shape of a substantially obliquely truncated circular cylinder which is adapted to pierce the sealing cap, and a base forming portion having the shape of a substantially truncated cone which is adapted to dish out the edge of the hole made in the sealing cap by the point forming portion of the piercing pin so as to avoid the piercing pin from remaining stuck inside the hole made in the scaling cap.

The holding means is formed of a pair of jaws adapted to firmly hold the striking member in a cocked condition against the action of the coil compression spring.

The actuation means is formed of a removable key member which is inserted between the pair of jaws in order to keep said pair of jaws in a closed condition for firmly holding the striking member and to permit said pair of jaws to be brought in an open condition for releasing said striking member upon removal of said key member, and said control means is formed of a cord connected to the removable key member.

BRIEF DESCRIPTION OF DRAWINGS

The characteristics and advantages of the present invention will become apparent from the following detailed description of a preferred embodiment thereof, illustrated only by way of non-limitative example in the accompanying drawings, wherein:

FIG. 1 is a longitudinal section view of the inflator according to the present invention, shown with the striking member in a first operative position and ready for use;

FIG. 2 is a cross-section view of the inflator according to the present invention taken along line II—II of FIG. 1;

FIG. 3 is a longitudinal section view of the inflator according to the present invention, shown with the striking member in a second operative position after it is released from the holding means and accelerated by the coil compression spring;

FIG. 4 is a cross-section view of the inflator according to the present invention taken along line IV—IV of FIG. 3;

BEST MODE FOR CARRYING OUT THE INVENTION

Figure 5:
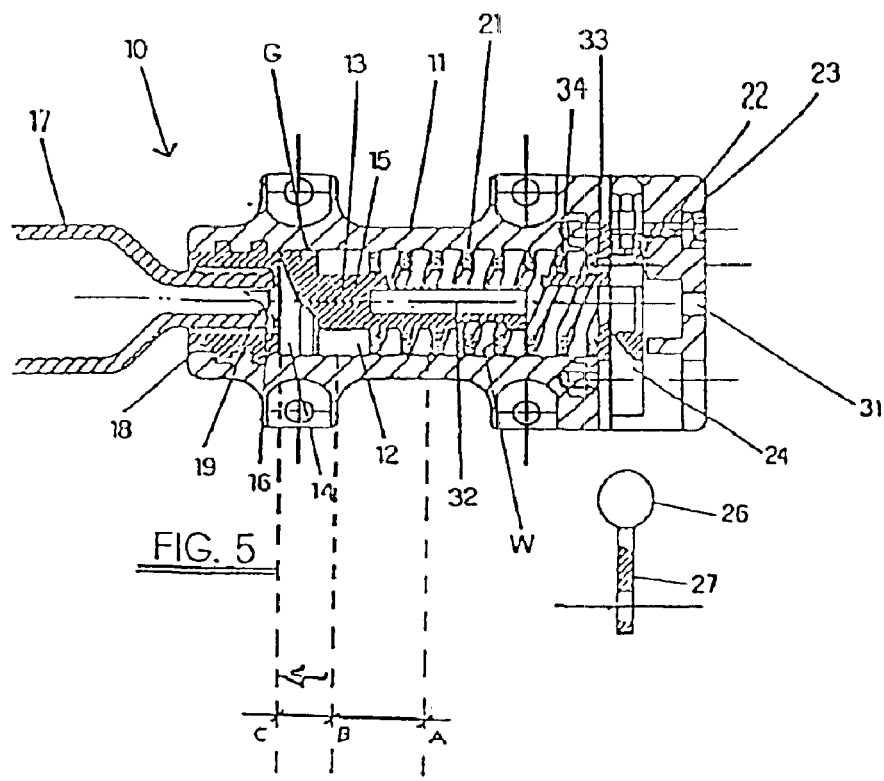
FIG. 5 is a longitudinal Section view of the inflator according to the present invention, shown with the striking member in a third operative position in the instant it perforates the cap of the gas-containing bottle.

Referring to FIGS. 1 and 2 of the drawings, there is shown the inflator according to the present invention, generally designated by 10. This inflator comprises an inflator body 11 having inside an inflator housing 12 in which a striking member 13 is contained so as to be movable in the direction of the length of the inflator housing. The striking member 13 has a head portion 14, comprising a pair of separated apart collars 14A and 14B with arranged therebetween a sealing gasket G, and an elongated stem-like portion 15. The head portion 14 of the striking member 13 is provided with a protruding piercing pin 16, which is adapted to perforate a cap 19 of a gas-containing bottle 17 associated with the inflator 10. This gas-containing bottle 17 is connected to the inflator body 11 by means of a connecting portion 18 thereof. The inflator body 11 is further provided with a gas outlet port 20 made in the inflator housing 12, near to the cap 19 of the gas-containing bottle 17. The gas outlet port 20 connects the inflator 10 to a passage (not shown) which permits the gas escaping from the bottle 17 to flow from the inflator 10 into an inflatable protective article or gear in fluid communication with the inflator 10.

The shape of the piercing pin 16 is adapted to perforate the cap 19 of the gas-containing bottle 17 and to enlarge the hole made therein. To this purpose, the piercing pin 16 has a point forming portion 16A having the shape of an obliquely truncated circular cylinder, which is intended to perforate and bend inwardly the sealing plate of the cap 19 of the gas-containing bottle 17, and a base forming portion 16B having the shape of a truncated cone, intended to dish out the edge of the hole made in the cap 19 of the gas-containing bottle 17, so as to enlarge this hole and prevent the piercing pin 16 from remaining stuck therein.

The striking member 13 is urged by a coil compression spring 21 which is arranged around the stem-like portion 15 of the striking member 13. The striking member 13 is kept in the cocked position against the action of this coil compression spring by means of a holding member 22 contained in an inflator end closing portion 23 connected to the inflator body 11 opposite to the gas-containing bottle 17. The holding member 22 is formed of a pair of pivoting jaws 24, 25 which grasp the stem-like portion 15 of the striking member 13 at the end opposite to the head portion 14 thereof so as to firmly hold it in the cocked position ready to be used, as shown in FIG. 1. A removable key member 26 keeps the jaws 24, 25 in a closed position against the action of a spring member 29 acting thereon, and further against the action of the coil compression spring 21, in order to firmly hold the striking member 13. In FIG. 1 it can be noted that the jaws 24, 25 engage a wedge-shaped recess W provided in the surface of the stem by portion 15 of the striking member and act thereon against the action of the coil compression spring 21. By suitably shaping the inclined surface of the wedge-shaped recess W it is possible to adjust the force necessary to extract the removable key member 26 in the construction of the inflator 10 of the present invention. The removable key member 26 preferably has a spherical or hemispherical shape and is provided with a rod-like portion 27 to which an operating cord 28 is connected. By pulling this operating cord 28 the key member 26 can be extracted from the holding member 22 in order to free the jaws 24, 25. These jaws 24, 25 thus open under the action of the spring member 29 and also of the coil compression spring 21, through the intermediary of the wedge-shaped recess W, and release the striking member 13. The use of a key member 26 shaped as described above assures that the inflator 10 can be operated by pulling the cord in multiple different directions which are generally represented by the angles alfa and beta in FIGS. 1 and 2.

The force necessary to extract the key member 26 from the holding member 22 can be adjusted prior to the operation of the inflator 10 by means of a set screw 30 which centrally urges the spring member 29. By acting on the set screw 30, the tension of the spring member 29 and, therefore the force transmitted to the jaws 24, 25, can be adjusted. This permits the force necessary to operate the inflator 10 to be adjusted. The inflator and closing portion 23 containing the holding member 22 is suitably provided with adjustment notches (not shown) on its outer surface so as to refer thereto for an easy adjustment of the force for operating the inflator.

In FIGS. 1 and 2 the inflator 10 is shown in a condition ready to be used. In this condition, the coil compression spring 21 is compressed and the jaws 24, 25 keep the striking member 13 in the cocked position. As already explained above, the inflator 10 can be operated by pulling the operating cord 28.

With reference now to the FIGS. 3–6 of the drawings, the operation of the inflator 10 according to the present invention will be described.

Upon pulling the operating cord 28, the key member 26 is extracted, and the jaws 24, 25 open thereby releasing the striking member 13. During a first phase the striking member 13 accelerates as a result of the thrust exerted by the coil compression spring 21 and travels along a first section AB of its run towards the cap 19 of the gas-containing bottle 17. In a second phase, when the coil compression spring 21 has terminated its working travel, the striking member 13 is free and has a determined and calculated quantity of kinetic energy. The striking member 13 continues its travel along a second section BC of its run towards the cap 19 of the gas-containing bottle 17. During this phase the striking member 13 closes the gas outlet port 20 with its head portion 14 and causes the piercing pin 16 to penetrate the cap 19 of the gas-containing bottle 17 so as to make a hole therethrough.

The point forming portion 16A of the piercing pin 16 perforates and bends inwardly the sealing plate of the cap 19, whereas the base forming portion 16B of the piercing pin 16 dishes out the edge of the hole made in the cap 19 of the gas-containing bottle 17. The condition of the inflator 10 corresponding to this operating moment is illustrated in FIG. 5.

Once the cap 19 of the gas containing bottle 17 is pierced, the gas escapes from the gas-containing bottle 17 and exerts a pressure on the head portion 14 of the striking member 13 so as to drive this backwards. In the first section CB of its backward travel, the striking member 13 is not contrasted by the coil compression spring 21 and the head portion 14 of the striking member 13 causes the gas outlet port 20 to open, thus permitting the gas to flow from the inflator 10 into an inflatable protective article or gear. In the second section BA of its backward travel, the striking member 13 is slowed by the coil compression spring 21 which acts on the striking member so as to dampen the impulse transmitted thereto by the gas flowing out from the gas-containing bottle 17. This prevents the striking member 13 from breaking the inflator 10 as a result of the thrust exerted by the pressurised gas.

In order to avoid the piercing pin 16 from remaining stuck in the hole made in the cap 19 of the gas-containing bottle 17, three measures have been taken which assure that the piercing pin 16 withdraws from the hole made in the cap 19 of the gas-containing bottle 17 and makes a rapid and certain return travel in order to completely free the outflow path of the gas.

A first measure relates to the shape of the piercing pin 16. In particular, as already explained above, the piercing pin 16 is so shaped as to have a point forming first portion 16A in the shape of an obliquely truncated circular cylinder, intended to pierce and bend inwardly the plate of the cap 19 of the gas-containing bottle 17, and a base forming second portion 16B in the shape of a truncated cone, intended to dish out the edge of the hole made in the cap 19 of the gas-containing bottle 17, so as to assure that the piercing pin 16 can withdraw from the hole made in the cap 19 of the gas-containing bottle 17 as a result of the thrust exerted by the pressurised gas.

A second measure relates to the fact that the first section CB of the return travel of the striking member 13, once the piercing pin 16 has made a hole in the cap 19 of the gas-containing bottle 17, is not contrasted by the coil compression spring 21, so that in this section the travel of the striking member 13 consists in a free backward movement. The coil compression spring 21 slows the striking member 13 only in the second section BA of its return travel. This permits the striking member 13 to be withdrawn inside the inflator housing 12 without being contrasted by the coil compression spring 21 in its return travel, at least during the first section CB.

A third measure consists in that, at the instant the piercing pin 16 perforates the cap 19 of the gas-containing bottle 17, a pressurised chamber is formed close to it, which chamber is defined by the head portion 14 of the striking member 13 and the side wall of the inflator housing 12 wherein the striking member 13 is contained. Referring to FIG. 5, it should be noted that in the first instants after the cap 19 of the gas-containing bottle 17 is perforated, the gas outlet port 20 is closed by the head portion 14 of the striking member 13, so that the pressure of the gas flowing out from the gas-containing bottle 17 remains at a very high value, substantially the same value as that inside the gas-containing bottle 17 when it is sealingly closed by the cap 19. The high-pressure gas contained in this chamber acts on the head portion 14 of the striking member 13 and causes it to move rapidly backwards so as to open the outlet 20 and permit the gas to flow out Following to a series of studies, tests and trails it has been possible to verify that by taking the measures described above the piercing pin 16 does not remain stuck in the cap 19 of the gas-containing bottle 17 after its perforation.

Figure 6:
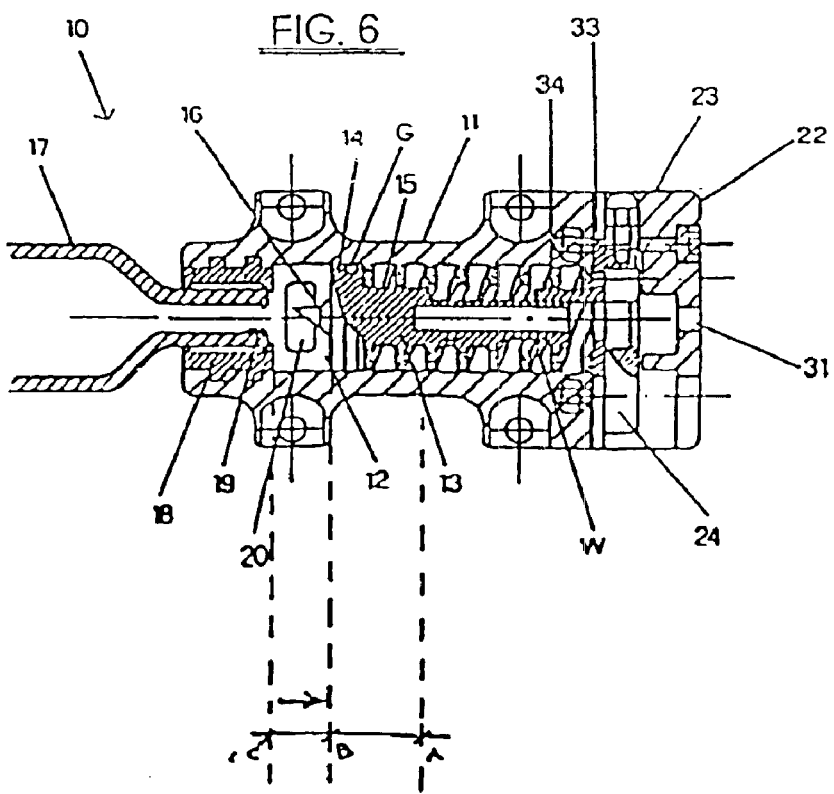
FIG. 6 is a longitudinal section view of the inflator according to the present invention, shown with the striking member in a fourth operative position after the striking member is withdrawn from the hole made in the cap of the gas-containing bottle.

FIG. 6 shows the inflator 10 in the condition corresponding to the operating instant when the striking member 13 is withdrawn by a sufficient length to completely open the gas outlet port 20. In this operating instant the pressurised gas is free to flow out from the hole made in the cap 19 of the gas-containing bottle 17 without this flow being obstructed by the piercing pin 16 of the striking member 13 which is in a withdrawn position, beyond the gas outlet port 20.

As can be seen in FIG. 6, the gas outlet port 20 is larger than the hole made in cap 19 by the piercing pin 16 of the striking member 13. Moreover, the gas flow is diverted only once inside the inflator housing 12 in the direction of the gas outlet port 20 and so the gas flows along a path having minimum length. The rate of flow of the gas is proportional to the area of the passage of the hole made in the cap 19 of the gas-containing bottle 17 and since this area is the largest possible consistent with the structure of the cap 19, also the rate of flow is the greatest admissible under the nature of the gas in these conditions, in particular its molecular weight. Consequently the time the gas contained in the bottle 17 requires to flow out therefrom is minimum.

Once the inflator has been put into operation, it can be reset by compressing the coil compression spring 21. To this purpose, a screw (not shown) can be used which is intended to be inserted in an adapted through hole 31 made in the inflator end closing portion 23 and to engage a threaded hole 32 extending longitudinally inside the stem-like portion 15 of the striking member 13. By screwing this screw, the striking member 13 is moved closer to the holding member 22 and the coil compression spring 21 is compressed. When the screw is screwed the rotation of the striking member 13 about its longitudinal axis is prevented by A strip 33 connected to the inflator body 11 and provided with a projecting flat element 34 co-operating with an upper flat surface of the stem-like portion 15 of the striking member 13. Once the coil compression spring 21 is compressed, the key member 26 is inserted between the jaws 24, 25 so that they can firmly hold the stem-like portion 15 of the striking member 13 and the screw is removed. The striking member 13 is reset in the cocked condition shown in FIG. 1 and thus the inflator 10 is ready to be used again. Of course, other equivalent means can be used to reset the striking member 13 in the cocked position.

From the foregoing, it can be understood that the measures taken in the inflator 10 of the present invention permit the aimed object to be attained.

In particular, the outflow time of the gas from the gas-containing bottle 17 and therefore the time of inflation is very short. This permits the effectiveness of the inflator to be improved in applications such as those in which a very prompt reaction is required. A time of inflation comparable to that of a pyrotechnically operated inflator for a motor vehicle air bag can be achieved thereby, without having recourse however to such a pyrotechnically operated inflator.

Moreover, the shape of the point forming portion 16A of the piercing pin 16, the free return travel of the striking member 13, the arrangement of the outlet 20 together with the pressure of the gas in the gas-containing bottle assure that the piercing pin 16 does not remain stuck in the hole made in the cap 19 of the gas-containing bottle 17. In fact, during the perforation of the cap 19 of the gas-containing bottle 17, the gas outlet port 20 is closed by the head portion 14 of the striking member 13 and is not opened until the striking member 13 is withdrawn as a result of the impulse transmitted on the head portion 14 of the striking member 13 by the pressurised gas contained in the gas-containing bottle 17. In particular, the impulse transmitted to the head portion 14 of the striking member 13 is great because it occurs when the gas outlet port 20 is closed by the head portion 14 of the striking member 13. The striking member 13 has a free return travel in order to be capable to be withdrawn inside the inflator housing 12 without the coil compression spring 21 contrasting its withdrawal. The striking member 13 is not contrasted by the coil compression spring 21 and the gas exerts thereon a very high pressure. Therefore, a very great thrust is exerted on the head portion 14 of the striking member 13 which permits the same striking member 13 to be withdrawn very quickly, completely liberating the passage for the gas. The impulse transmitted to the head portion 14 of the striking member 13 is so great that, once the head portion 14 of the striking member 13 has opened the gas outlet port 20, the coil compression spring 21 must come into action to slow the return travel of the striking member 13. Moreover, the surface area of the head portion 14 of the striking member 13 is so calculated that, when it is urged by the flow of pressurised gas, a force is exerted on the head portion 14 which is much greater than the force retaining the piercing pin 16 in the cap 19 of the gas-containing bottle 17. Furthermore, the travel and the mass of the striking member 13 accelerated by the action of the coil compression spring 21 are calculated so as to impart to the striking member 13 a quantity of kinetic energy greater than that required to perforate the cap 19 of the gas-containing bottle 17. The gas can flow out from the gas-containing bottle 17 through a very short and completely free passage, without being disturbed by the presence of the piercing pin 16.

With the inflator 10 of the present invention it is possible to make holes in the cap 19 of a gas-containing bottle 17 having maximum size consistent with the structure of the cap 19.

In order to evaluate the effectiveness of the inflator according to the present invention, the Applicant has carried out tests on the inflator of the present invention. The time required to empty the gas-containing bottle has been chosen as an element for evaluating the effectiveness of the inflator of the present invention. In the following some significant results are reported.

The inflator according to the present invention has been connected to an inflatable article. The inflation tests have been carried out using gas-containing bottles available on the market containing gas $CO_2$.

The tests were shot with a camera having an acquisition speed of 25 photos per second and processed with a computer. The tests with gas $CO_2$ were carried out at room conditions. The test were repeated at a temperature different from the room temperature and the differences between the results of the tests at this different temperature were not important with respect to the results obtained at room temperature.

The following Table reports the test conditions and the approximate time required to obtain complete inflation of the inflatable article at room conditions (temperature 20–22° C.; relative humidity 50–60%). By suitably choosing the volume and the shape of the inflatable article, the nature of the gas, the mass of the gas and the diameter of the cap of the gas-containing bottle it is possible to further reduce the inflation time of the inflatable article, for instance an air bag for a motor vehicle rider. The Table also reports how the inflation time changes with the mass of the gas and the diameter of the nozzle of the gas-containing bottle. The tests were carried out keeping the form and the volume of the inflatable article, the nature of the gas and the ambient conditions unchanged.

TABLE

| Nature of gas | Mass of gas [g] | Nozzle diameter [in] | Inflation time [ms] |
|---|---|---|---|
| $CO_2$ | 33 | 1/2 | 120 circa |
| $CO_2$ | 30 | 5/8 | 80 circa |
| $CO_2$ | 38 | 5/8 | 40–80 circa (*) |
| $CO_2$ | 75 | 5/8 | 40 circa |

*(It is to recall that in these tests the acquisition speed is equal to 25 photos per second. This means that there is a time interval of 40 ms elapsing between a photo and the following. The study of the inflation time was carried out observing the photos. In this case there is an uncertainty due to the acquisition system. From study it is resulted that the inflatable article was not completely inflated according to the photo taken at 40 ms, whereas it was completely inflated at the photo corresponding to 80 ms. This means that the inflatable article was being completely inflated in a time between 40 and 80 ms.)

Test conditions being equal, further reductions in the inflation time can be obtained with gases having a lower molecular weight than carbon dioxide, for example argon and helium.

Clearly, in order to measure with more accuracy a very short inflation time it is suitable to use acquisition systems having a speed of more than 25 photos per second, e.g. 250 photos per second. Using a camera having an acquisition speed of 250 photos per second it has been found that the inflation time is even shorter than that reported in the above Table.

The tests carried out show that by a suitably selection of the design parameters of the inflator, it is possible to obtain even a shorter time for inflating an inflatable article.

In connection with this, taking into account that the inflation time of air bags having pyrotechnical inflators as declared by the manufacturers is comprised between 30 and 50 ms, from the Table it can be observed that the inflator according to the present invention permits inflation times of inflatable articles comparable to those of pyrotechnical inflators to be obtained.

Industrial Applicability

The inflator according to the present invention can be used for inflating various protective or safety inflatable articles in which a rapid inflation of one or more inflatable elements is required. By way of example, the inflator may be used for inflating a motor vehicle air bag, an inflatable protective jacket for a motorcycle rider, an inflatable protective sporting article and other similar safety articles, such as those required in equestrian sporting activities. Moreover, the inflator described herein can be used in all those applications in which the use of a pressurised gas is provided instead of an explosive charge to operate a device, for instance various kinds of arms.

Since the inflator is not operated pyrotechnically, it is safe to use and it can be arranged in an inflatable gear intended to be in close contact with a human body, without dangerously affecting the user.

Although the invention has been described in relation to a preferred embodiment thereof, a person skilled in the art would clearly make changes thereto without departing from the annexed claims. In particular, the piercing pin, although having a base forming portion with a progressively increasing diameter, may have a shape different from that illustrated in the drawings. Moreover, the inflator may be indirectly operated, by means of a control circuit of electromechanical or electronic kind, instead of being directly operated by means of an operating cord as described herein.

What is claimed is:

1. An inflator for inflating a pneumatic protective article or gear, comprising:
   a gas-containing bottle with a sealing cap applied thereto,
   an inflator housing,
   a striking member contained in said inflator housing and capable of moving lengthwise therein, and provided at a first end thereof with a protruding piercing pin (16) adapted to make a hole in said sealing cap of the gas-containing bottle,
   a coil compression spring contained in said inflator housing and adapted to urge said striking member at a second end thereof, opposite to said first end carrying the piercing pin, and to drive said striking member against the sealing cap of the gas-containing bottle,
   a gas outlet port provided in a wall of said inflator housing for permitting the gas contained in said gas-containing bottle to flow from said inflator into the pneumatic protective article or gear,
   holding means associated with said inflator and co-operating with said striking member in order to releasably hold it in a cocked condition against the action of said coil compression spring,
   actuation means associated with said inflator and adapted to release said holding means, and
   control means associated with said actuation means and adapted to operate said inflator by causing said actuation means to release said holding means,
   characterized in that:
   said piercing pin comprises a point forming portion having the shape of a substantially obliquely truncated circular cylinder which is adapted to pierce the sealing cap, and a base forming portion having the shape of a substantially truncated cone which is adapted to dish out the edge of the hole made in the sealing cap by the point forming portion of the piercing pin so as to avoid said piercing pin from remaining stuck inside the bole made in the sealing cap,
   said holding means is formed of a pair of jaws adapted to firmly hold the striking member in a cocked condition against the action of said coil compression spring,
   said actuation means is formed of a removable key member which is inserted between the pair of jaws in order to keep said pair of jaws in a closed condition for firmly holding the striking member and to permit said pair of jaws to be brought in an open condition for releasing said striking member upon removal of said key member, and
   said control means is formed of a cord connected to the removable key member.

2. An inflator according to claim 1, characterized in that said striking member has a forwarded travel directed towards the gas-containing bottle comprising a first forward travel section in which the striking member is urged and accelerated by the coil compression spring and a second forward travel section in which the striking member is separated from said coil compression spring and perforates the gas-containing bottle.

3. An inflator according to claim 1, characterized in that said striking member has a backward travel directed away from the gas-containing bottle comprising a first backward travel section in which the striking member is separated from the coil compression spring and is accelerated by the thrust exerted by the pressurized gas and a second backward travel section in which the striking member is contrasted by the coil compression spring.

4. An inflator according to claim 1, characterized in that, during the perforation of the sealing cap of the gas-containing bottle, said striking member closes the gas outlet port of the inflator housing so as to create a pressurized chamber defined by the striking member and the walls of the inflator housing in which said striking member is contained, said gas outlet port being subsequently opened when the striking member has covered a first backward travel section of its backward travel away from the gas-containing bottle so as to permit the gas to flow from the inflator into the pneumatic protective article or gear.

5. An inflator according to claim 1, characterized in that the extension of the coil compression spring in the uncompressed condition is such as to permit the striking member to cover a first backward travel section of its backward travel away from the gas-containing bottle while not counteracted by said coil compression spring in order to not obstruct the gas flowing out from the gas-containing bottle.

6. An inflator according to claim 1, characterized in that it further comprises regulating means for adjusting the clamping force of the pair of jaws on the striking member, and therefore the force required to extract the removable key member, said regulating means being formed of a set screw acting on the jaws by means of a spring member.

7. An inflator according to claim 1, characterized in that, for resetting the striking member in a cocked condition, a threaded closed hole extending longitudinally inside the striking member is provided, which hole is adapted to receive a screw member by screwing which said striking member is withdrawn and compresses the coil compression spring until the striking member is engaged by the pair of jaws.

8. An inflator according to claim 1, characterized in that the removable key member has a spherical or hemispherical shape so as to permit the inflator to be actuated when the cord is pulled in multiple different directions and is provided with a rod-like portion to the end of which the cord is connected.

9. An inflator according to claim 1, characterized in that the passage area of the gas outlet port is larger than the passage area of the hole made in the sealing cap of the gas-containing bottle.

10. An inflator according to claim 2, characterized in that, during the perforation of the sealing cap of the gas-containing bottle, said striking member closes the gas outlet port of the inflator housing so as to create a pressurized chamber defined by the striking member and the walls of the inflator housing in which said striking member is contained, said gas outlet port being subsequently opened when the striking member has covered a first backward travel section of its backward travel away from the gas-containing bottle so as to permit the gas to flow from the inflator into the pneumatic protective article or gear.

11. An inflator according to claim 3, characterized in that, during the perforation of the sealing cap of the gas-containing bottle, said striking member closes the gas outlet port of the inflator housing so as to create a pressurized chamber defined by the striking member and the walls of the inflator housing in which said striking member is contained, said gas outlet port being subsequently opened when the striking member has covered the first backward travel section of its backward travel away from the gas-containing bottle so as to permit the gas to flow from the inflator into the pneumatic protective article or gear.

12. An inflator according to claim 2, characterized in that the extension of the coil compression spring in the uncompressed condition is such as to permit the striking member to cover a first backward travel section of its backward travel away from the gas-containing bottle not contrasted by said coil compression spring in order to not obstruct the gas flowing out from the gas-containing bottle.

13. An inflator according to claim 3, characterized in that the extension of the coil compression spring in the uncompressed condition is such as to permit the striking member to cover the first backward travel section of its backward travel away from the gas-containing bottle not contrasted by said coil compression spring in order to not obstruct the gas flowing out from the gas-containing bottle.

* * * * *

UNITED STATES PATENT AND TRADEMARK OFFICE
CERTIFICATE OF CORRECTION

| | | |
|---|---|---|
| PATENT NO. | : 7,011,232 B2 | Page 1 of 1 |
| APPLICATION NO. | : 10/471013 | |
| DATED | : March 14, 2006 | |
| INVENTOR(S) | : Fabio Giovanni Fedele Colombo | |

It is certified that error appears in the above-identified patent and that said Letters Patent is hereby corrected as shown below:

Title page Item (75), please change "Fabio Giovanni Colombo" to --Fabio Giovanni Fedele Colombo--.

Title page Item (73), line 1, please change "Columbo" to --Colombo--; and line 2, please change "Columbo" to --Colombo--.

Signed and Sealed this

Sixth Day of February, 2007

JON W. DUDAS
*Director of the United States Patent and Trademark Office*